Feb. 2, 1926.  1,571,588
G. C. KELLING
MEASURING MACHINE FOR PEANUTS AND THE LIKE
Filed Feb. 1, 1922  5 Sheets-Sheet 1

Inventor,
Gustave C. Kelling,

Feb. 2, 1926.　　　　　　　　　　　　　　　1,571,588
G. C. KELLING
MEASURING MACHINE FOR PEANUTS AND THE LIKE
Filed Feb. 1, 1922　　　5 Sheets-Sheet 3

Inventor,
Gustave C. Kelling,

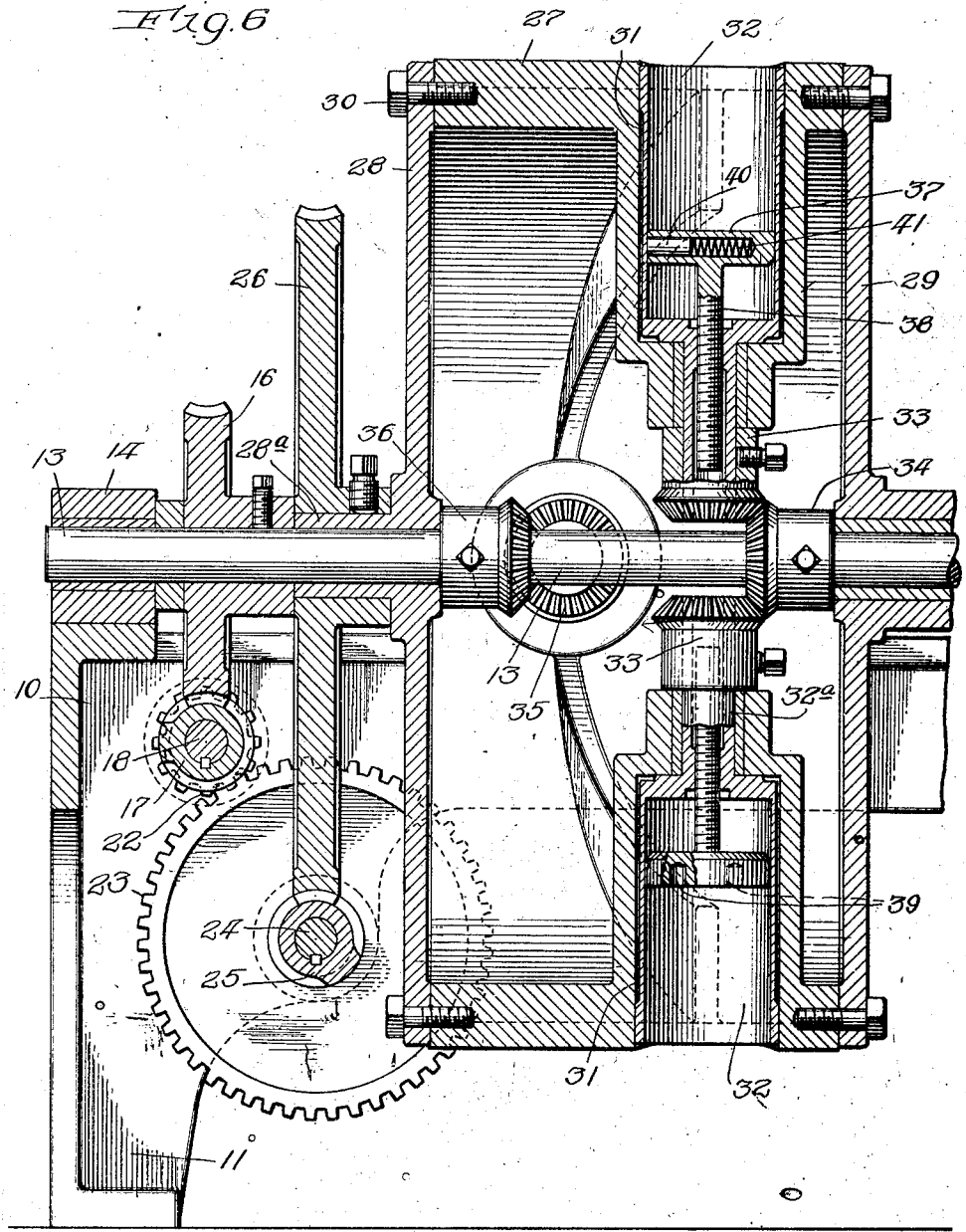

Patented Feb. 2, 1926.

1,571,588

UNITED STATES PATENT OFFICE.

GUSTAVE C. KELLING, OF CHICAGO, ILLINOIS.

MEASURING MACHINE FOR PEANUTS AND THE LIKE.

Application filed February 1, 1922. Serial No. 533,291.

*To all whom it may concern:*

Be it known that I, GUSTAVE C. KELLING, a citizen of the United States, residing at 800 North Clark Street, Chicago, in the county of Cook and State of Illinois, have invented a new and useful Improvement in Measuring Machines for Peanuts and the like, of which the following is a specification.

This invention relates to measuring machines for peanuts and the like and is fully described in the following specification and shown in the accompanying drawing, in which:

Fig. 6 is a partial vertical section on the line 6—6 of Fig. 3.

Figure 1:
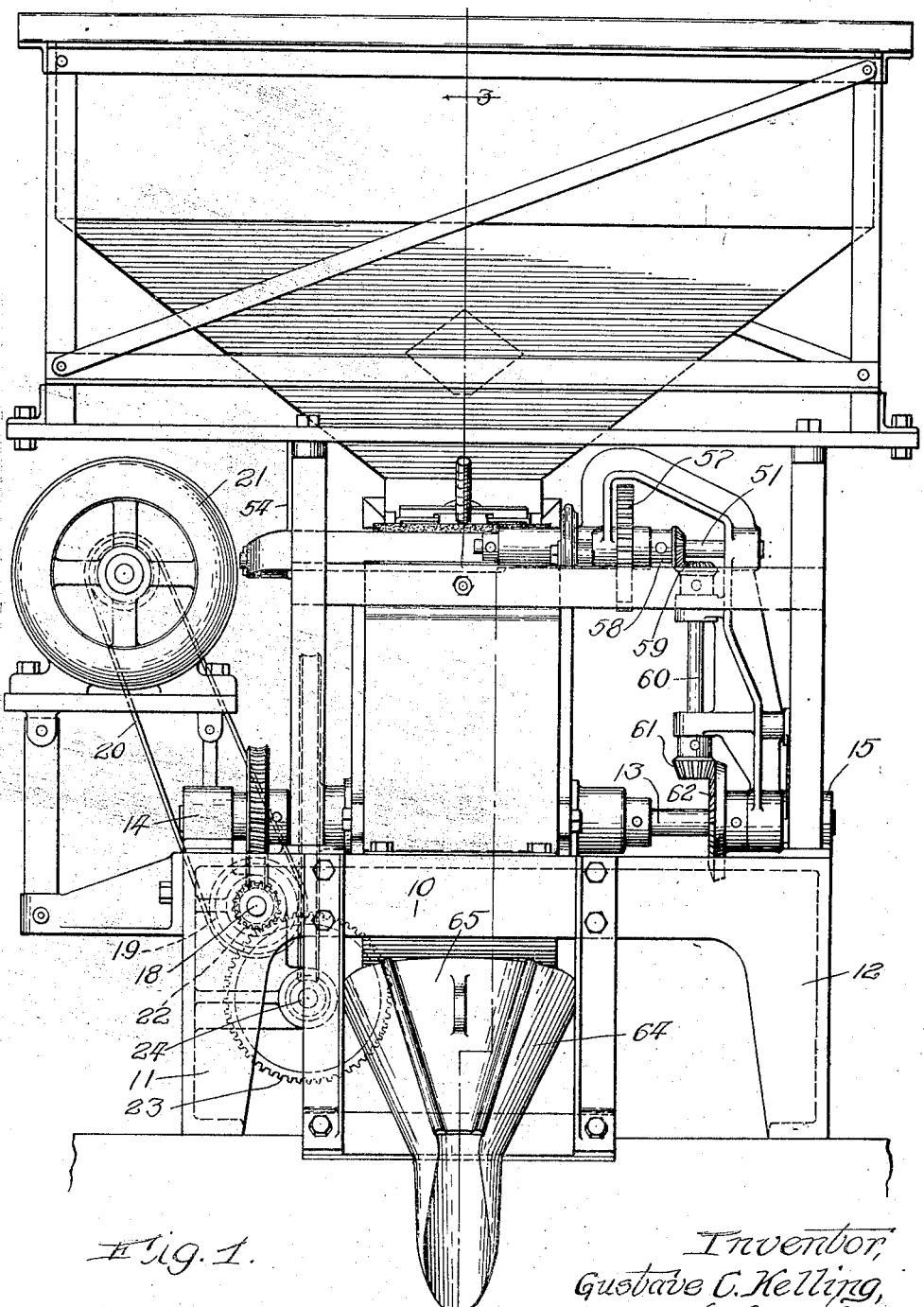
Figure 1 is a front elevation of the measuring machine.
Figure 2:
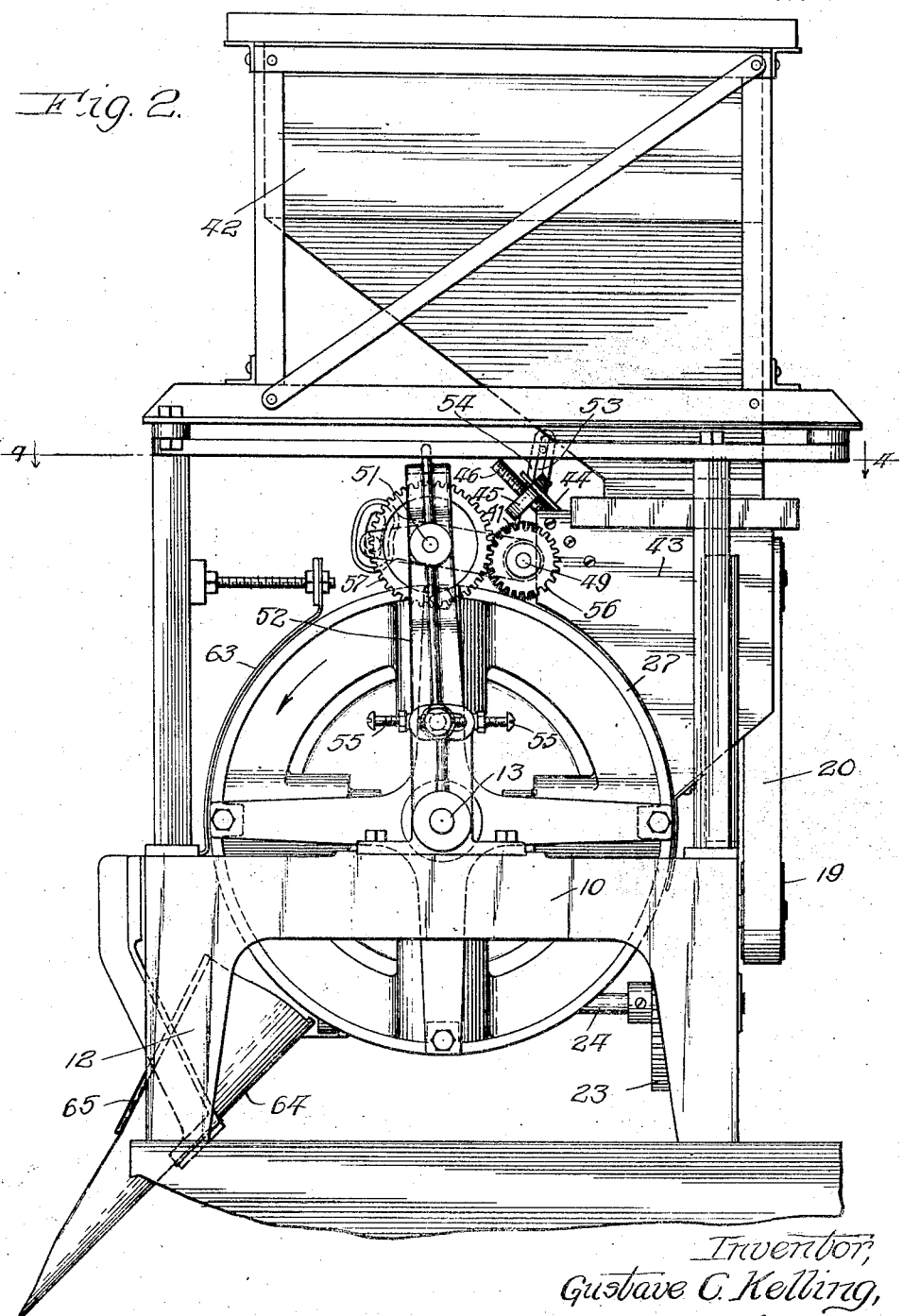
Fig. 2 is a right end elevation of the same.

The machine is mounted upon a frame 10 having legs 11 and 12. A shaft 13 is mounted in suitable bearings 14 and 15 on the frame and has secured thereon a worm wheel 16 which is driven by means of a worm 17 on the shaft 18. This shaft has a pulley 19 keyed thereon which is driven by means of a belt 20 from the motor 21, as shown in Fig. 1.

A pinion 22 keyed on the shaft 18 drives the gear 23 which is keyed on the shaft 24 which is journalled in suitable bearings in the frame 10. A worm 25 is also keyed on the shaft 24 which drives the worm wheel 26 as shown in Fig. 6. The cylindrical drum 27 is carried by flange plates 28 and 29 to which it is secured by means of bolts 30. These flange plates are journalled upon the shaft 13, one of them having an extension sleeve to which the worm wheel 26 is secured, so that the shaft is driven thereby.

Oppositely disposed radial cups 31 are formed in the drum 27 and each has a sleeve 32 mounted to rotate therein, the inner end of the sleeve being reduced and journalled in the bottom of the cup. Gears 33 are secured to the reduced inner ends 32$^a$ of the sleeves 32 and these mesh with a gear 34 which is keyed to the shaft 13.

A similar pair of sleeves are similarly mounted and driven by means of gears 35 carried thereby which mesh with the gear 36 which is keyed on the shaft 13.

The effective step of the measuring cups or sleeves 32 is regulated by means of a flat bottom 37 carried upon a screw 38 which is studded into the bottom of the sleeves 32. This flat bottom is provided with holes 39 so that it can be turned up or down by means of a suitable tool which can be inserted therein. This flat bottom has a radial hole in which is mounted a wooden plug 40 which is pressed outwardly against the sides of the sleeves 32 by means of a spring 41. This serves as a lock between the sleeve at the bottom so that the latter will not have a tendency to move after it is once set. A hopper 42 is suitably supported above the drum 27 and terminates in a box-like chute 43 partially covering one side of the drum. The opening from the hopper 42 into the chute 43 is controlled by means of a slide 44 which is adjustable in and out by means of a nut 45 on the screw 46.

Figure 3:
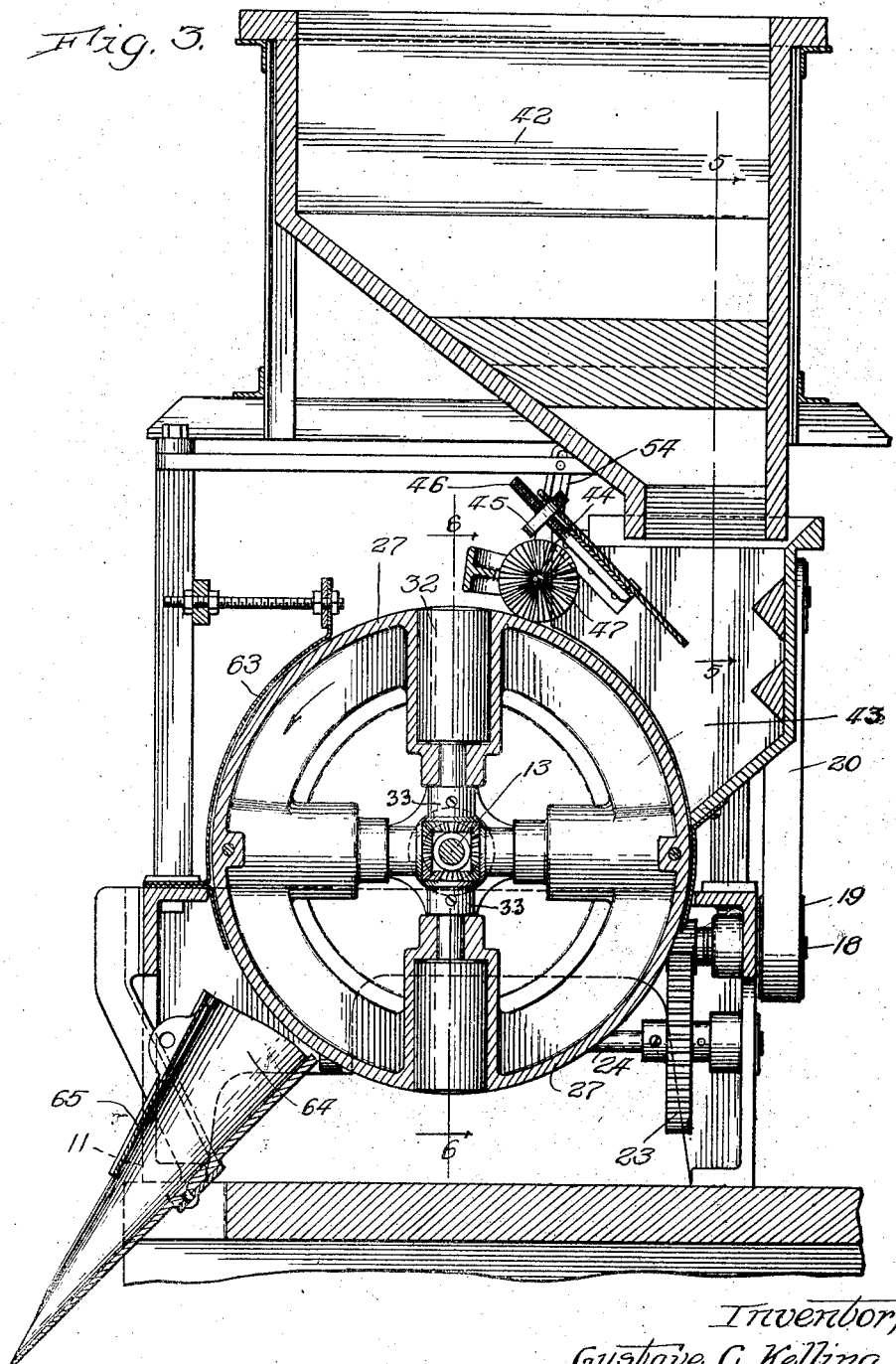
Fig. 3 is a vertical section on the broken line 3—3 of Fig. 1.

It will thus be seen that as the drum 27 is moved in a counter-clockwise direction as shown in Fig. 3, the peanuts placed in the hopper 42 will pass down through the chute 43 and will fill each receptacle 32 as it passes through the chute. The rotation of the receptacle by means of the gears 33 and 34 assists greatly in evenly filling them.

Figure 4:
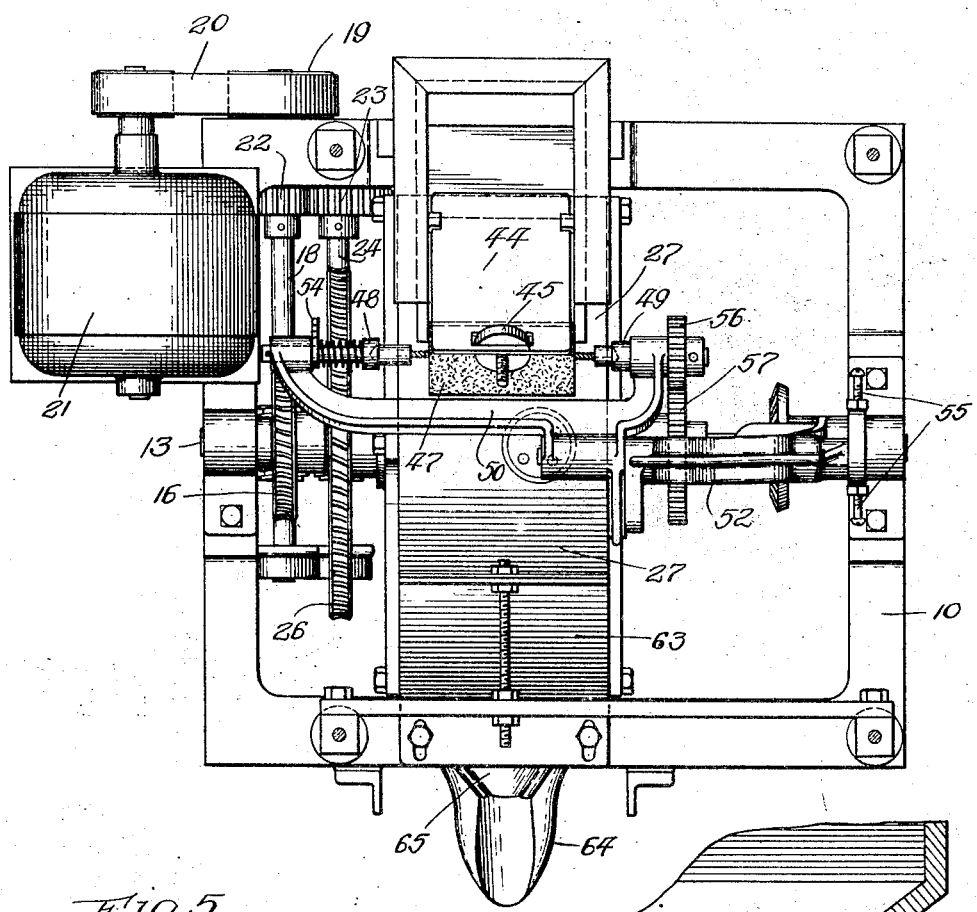
Fig. 4 is a horizontal section on the line 4—4 of Fig. 2.
Figure 5:
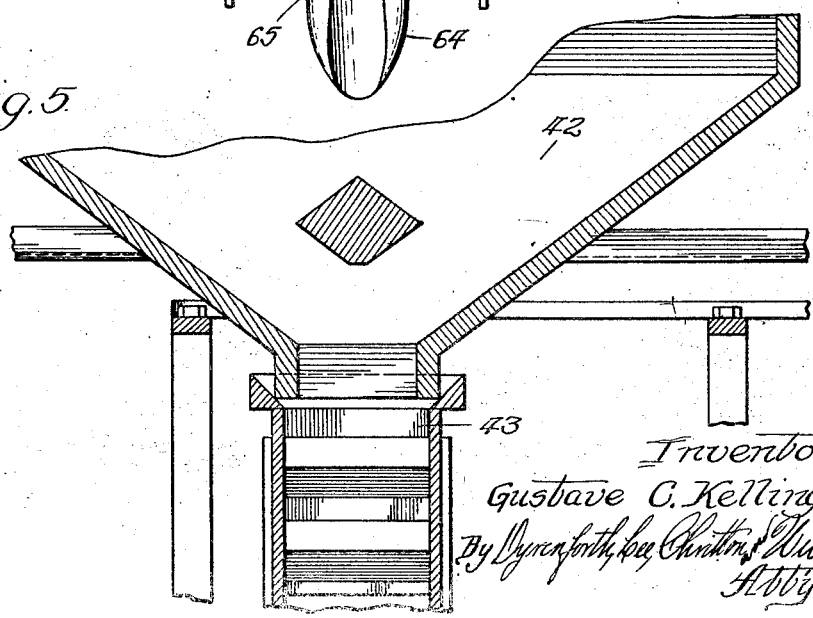
Fig. 5 is a partial vertical section on the line 5—5 of Fig. 3.

As the drum advances, peanuts are carried around thereby and a rotary brush 47 is provided for brushing back or "striking out" the excess peanuts so that the receptacle 32 will be evenly and uniformly filled each time. This brush is preferably mounted upon a shaft having tapered ends by means of which it may be releasably held between the spring pressed thimble 48 and the shaft 49 as shown in Fig. 4, which are journalled in alignment in opposite ends of the yoke 50 which is adjustably carried upon the shaft 51 on the arm 52. The outer end of the yoke 50 is moved up and down so as to adjust the pressure of the brush 47 on the drums 27 and is held in adjusted position by means of the screw passing through a slot 53 in the guide 54. The arm 52 is mounted about the shaft 13 and is provided with adjusting screw 55 so that it may be swung back and forth to some extent thereby changing the position of the rotary brush 47.

A gear 56 on the shaft 49 meshes with a gear 57 on the shaft 51 as shown in Fig. 1.

This shaft has a gear 58 keyed thereto which is driven by the beveled gear 59 on the shaft 60, which in turn is driven by the beveled gears 61 and 62 on the shaft 13.

The method of operation of this device is as follows:

Peanuts are placed in the hopper 42 and the motor 21 is started, driving the drum 27 in a counter-clockwise direction, as shown in Fig. 3. As each receptacle 32 is moved in front of the chute 43 peanuts are forced into it by gravity and the relatively fast rotation of the receptacles within the drum causes the receptacles to be evenly filled.

As the receptacle passes beneath the brush 47 the fresh peanuts are brushed off and the receptacle moves on, passing into the shield 63 as shown in Fig. 3. This fits the periphery of the drum quite closely and prevents the peanuts from falling out of the receptacle until the shield is passed, when they drop into the chute 64. This is provided with a removable cover 65 as shown in Fig. 1, which may be readily removed so as to clean the chute. The bottom of the chute is so formed as to permit of a paper bag or the like to be placed over the end of the chute, if desired.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A measuring machine for loose material comprising a frame, a member rotatably mounted thereon of cylindrical form, a plurality of outwardly opening receptacles therein, means for filling said receptacles with said material at a given point in its rotation, means for retaining said material in the receptacles, means for rotating said receptacles in the member as the latter rotates, and means for releasing said material at a given point in the rotation of the member.

2. A measuring machine for loose materials comprising a frame, a shaft journalled therein, a cylindrical member mounted on said shaft and having a plurality of radial openings therein, cups rotatably mounted in said openings, means driven by said shaft for turning said cups in their openings as the cylindrical member rotates, and means for striking off the top of said receptacles.

3. A measuring machine for loose material comprising a frame, a cylindrical member rotatably mounted thereon about a horizontal axis and having a receptacle therein opening radially, means for maintaining the top of said material on the rising side of the periphery of said cylindrical member at such a height that the loose material outside said receptacle will tend to roll down said member, leaving the receptacle filled and a rotary brush for sweeping off the excess loose material.

4. A measuring machine for loose material comprising a frame, a cylindrical member rotatably mounted thereon about a horizontal axis and having a receptacle therein opening radially, means for maintaining the top of said material on the rising side of the periphery of said cylindrical member at such a height that the loose material outside said receptacle will tend to roll down said member, and means on said rising side for brushing off the excess.

GUSTAVE C. KELLING.